(12) United States Patent
Cheng

(10) Patent No.: US 7,458,680 B1
(45) Date of Patent: Dec. 2, 2008

(54) EYEGLASSES

(76) Inventor: Yu-Chih Cheng, No. 10, Alley 16, Lane 40, Ta-Wan Rd., Yung-Kang City, Tainan Hsien (TW)

( * ) Notice: Subject to any disclaimer, the term of this patent is extended or adjusted under 35 U.S.C. 154(b) by 0 days.

(21) Appl. No.: 12/049,485

(22) Filed: Mar. 17, 2008

(30) Foreign Application Priority Data

Dec. 26, 2007 (TW) ............................... 96222166 U

(51) Int. Cl.
*G02C 1/02* (2006.01)
(52) U.S. Cl. ....................................... 351/110; 351/116
(58) Field of Classification Search ................. 351/110, 351/116, 120, 153, 41, 158, 83, 86, 103, 351/106; 16/228; D16/315, 311; 2/12, 13
See application file for complete search history.

(56) References Cited

U.S. PATENT DOCUMENTS 5,936,701 A * 8/1999 Sartor ........................ 351/110
6,994,434 B2 * 2/2006 Blanchette et al. .......... 351/110

\* cited by examiner

*Primary Examiner*—Hung X Dang
(74) *Attorney, Agent, or Firm*—Frommer Lawrence & Haug LLP; Ronald R. Santucci

(57) ABSTRACT

A pair of eyeglasses includes a lens unit, a pair of temples, and a pair of connectors. The lens unit has opposite end portions and opposite front and rear surfaces, and is formed with a pair of apertures respectively in the end portions. Each temple has a front end connected to a respective one of the end portions of the lens unit. Each connector includes a coupling provided on the front end of a respective one of the temples and aligned with the aperture in the respective one of the end portions of the lens unit, and a clasp having a pair of legs inserted through the aperture in a respective end portion of the lens unit, that abut against the rear surface of the respective end portion of the lens unit, and that sandwich the coupling therebetween.

6 Claims, 4 Drawing Sheets

EYEGLASSES

CROSS-REFERENCE TO RELATED APPLICATION

This application claims priority of Taiwanese Application No. 096222166, filed on Dec. 26, 2007, the disclosure of which is incorporated herein by reference.

BACKGROUND OF THE INVENTION

1. Field of the Invention

This invention relates to eyeglasses, more particularly to eyeglasses which can be assembled easily, and which have an attractive and sleek design.

2. Description of the Related Art

Many wearers of eyeglasses select a design that is simple, thin, and lightweight, and that provides comfort while introducing a unique appearance. However, fasteners, such as screws, bolts, etc., are often used for assembling the different parts of the eyeglasses together. This makes assembly difficult, and goes against efforts at realizing a simple, thin, lightweight, and appealing design. Moreover, the connections may become loose over time.

SUMMARY OF THE INVENTION

It is an object of the present invention to provide a pair of eyeglasses that can overcome the above drawbacks of the prior art.

According to the present invention, eyeglasses include a lens unit, a pair of temples, and a pair of connectors. The lens unit has opposite end portions and opposite front and rear surfaces, and is formed with a pair of apertures respectively in the end portions. Each temple has a front end connected to a respective one of the end portions of the lens unit. Each connector includes a coupling provided on the front end of a respective one of the temples and aligned with the aperture in a respective one of the end portions of the lens unit, and a clasp having a pair of legs inserted through the aperture in a respective one of the end portions of the lens unit, that abut against the rear surface of the respective one of the end portions of the lens unit, and that sandwich the coupling therebetween.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
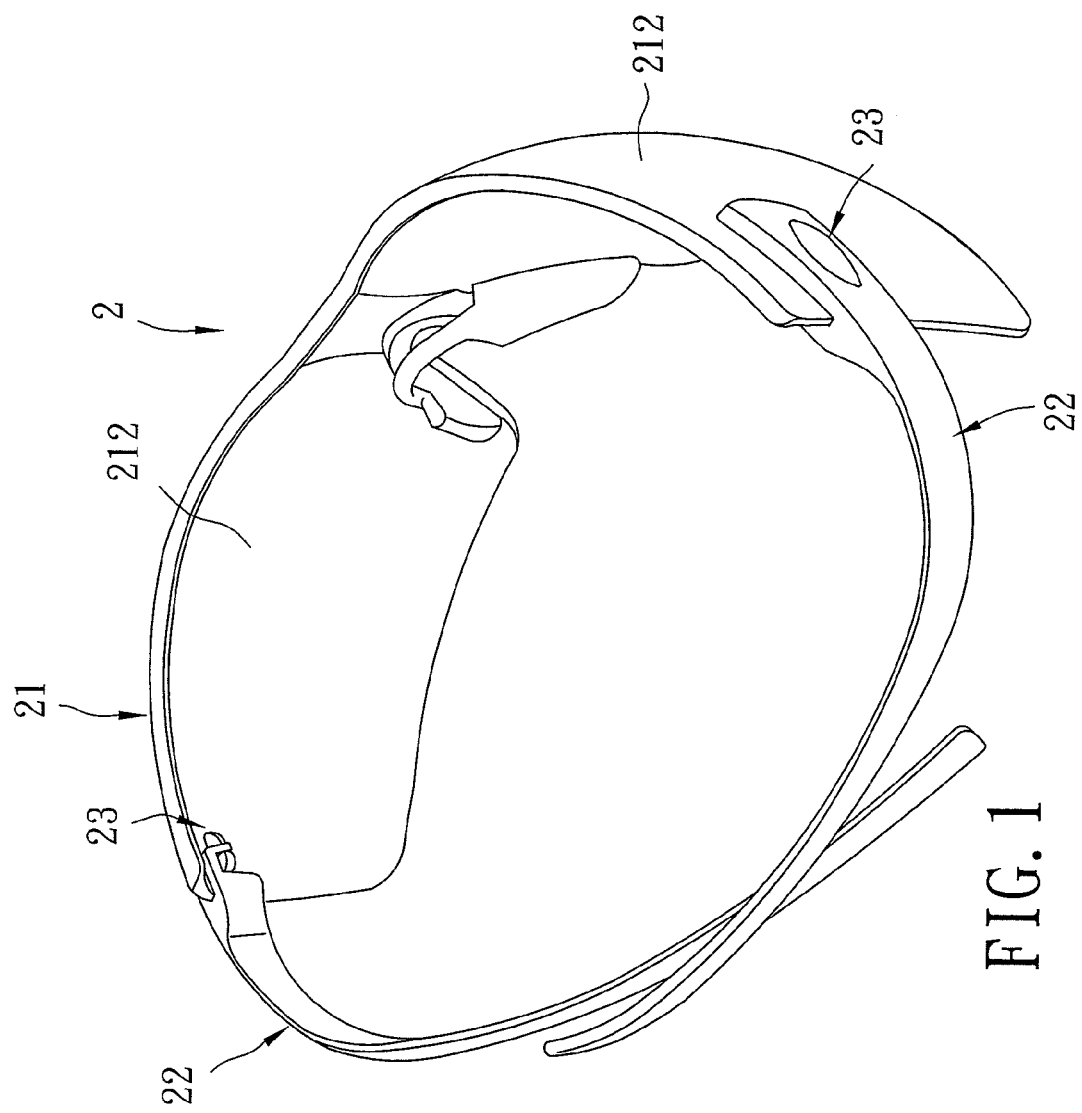
FIG. 1 is a perspective view of the preferred embodiment of a pair of eyeglasses according to the present invention.
Figure 2:
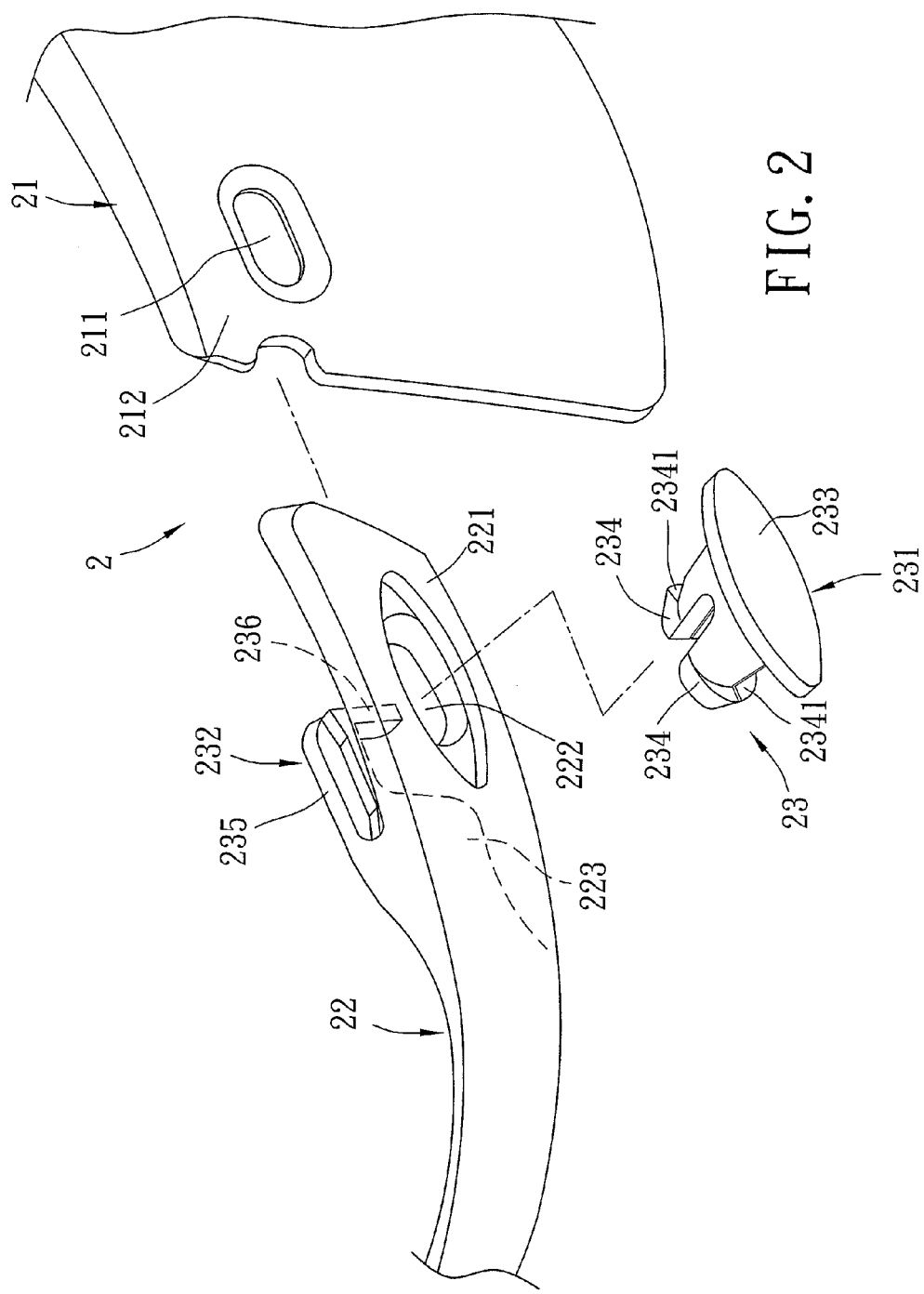
FIG. 2 is a fragmentary exploded perspective view of the preferred embodiment.

Referring to FIGS. 1 and 2, the preferred embodiment of a pair of eyeglasses 2 according to the present invention include a lens unit 21, a pair of temples 22, and a pair of connectors 23. In the preferred embodiment, the lens unit 21 includes a pair of rimless lenses 212. The lens unit 21 has opposite end portions and opposite front and rear surfaces, and is formed with a pair of apertures 211 respectively in the end portions. Each temple 22 has a front end connected to a respective one of the end portions of the lens unit 21. Each connector 23 includes a coupling 232 provided on the front end of a respective one of the temples 22 and aligned with the aperture 211 in a respective one of the end portions of the lens unit 21, and a clasp 231 having a pair of legs 234 inserted through the aperture 211, that abut against the rear surface of the end portion of the lens unit 21, and that sandwich the coupling 232 therebetween.

Figure 3:
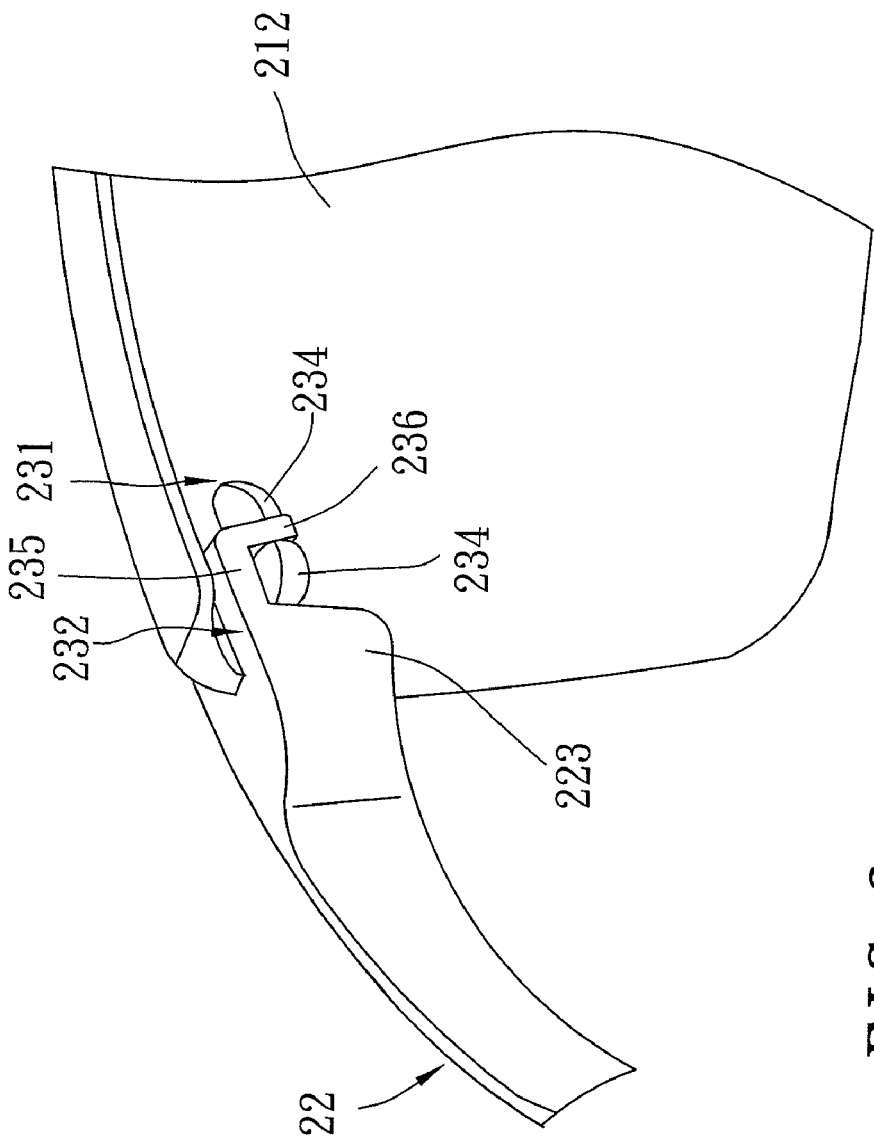
FIG. 3 is another fragmentary view of the preferred embodiment, but illustrating the eyeglasses in a state of assembly.
Figure 4:
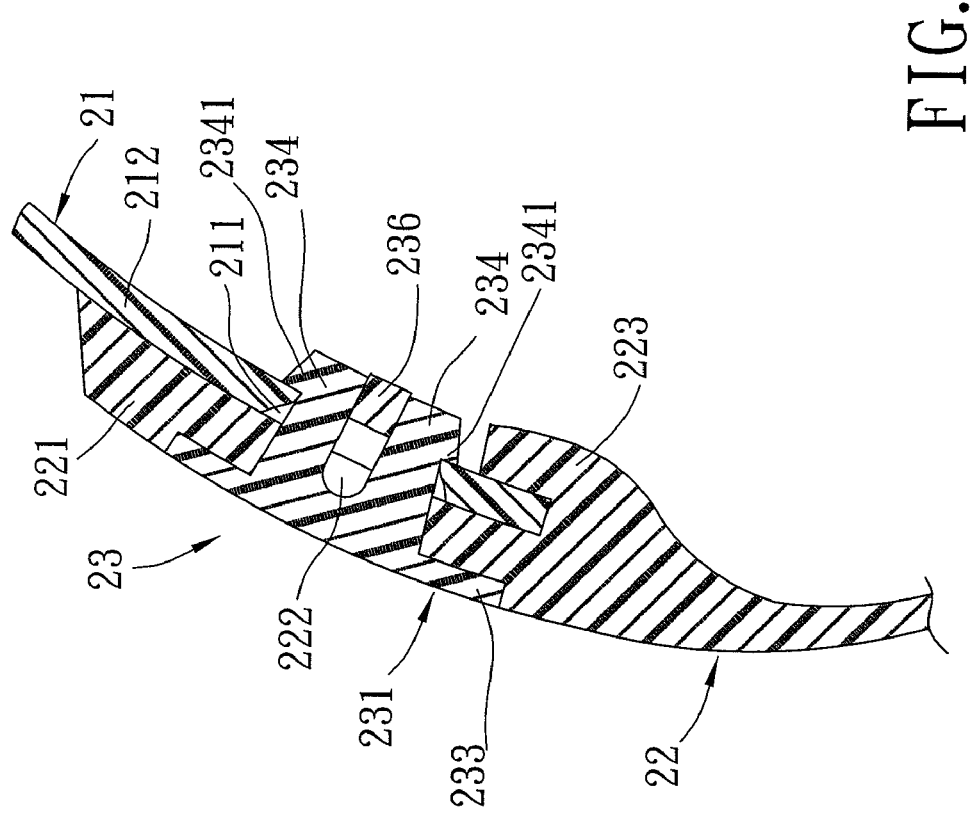
FIG. 4 is a sectional view of FIG. 3.

Reference is now made to FIGS. 2, 3, and 4. Each of the temples 22 includes a first clamping arm 221 that abuts against the front surface of the end portion of a respective one of the lenses 212. The first clamping arm 221 is formed with a positioning hole 222 that is aligned with the aperture 211 in the respective one of the lenses 212. The clasp 231 of each of the connectors 23 includes a head portion 233 that abuts against the first clamping arm 221 of the respective temple 22. The legs 234 of the clasp 231 are connected to the head portion 233 and extend through the positioning hole 222 and the aperture 211 in a respective end portion of the lens unit. Each temple 22 further includes a second clamping arm 223 that abuts against the rear surface of the respective end portion of the respective one of the lenses 212. In the preferred embodiment, the coupling 232 of each of the connectors 23 is formed as a single piece with the second clamping arm 223.

In the preferred embodiment, the coupling 232 of each of the connectors 23 is L-shaped and includes a horizontal member 235 extending horizontally from the second clamping arm 223 to above the legs 234 of the clasp 231, and a vertical member 236 extending vertically from an end of the horizontal member 235 distal from the second clamping arm 223 and between the legs 234. As such, the vertical member 236 is inserted between the legs 234 so as to spread apart the legs 234. This results in firm engagement of the legs 234 to the rear surface of the lens 212. To assemble the eyeglasses, the end portions of the lenses 212 are first aligningly and respectively inserted into the front ends of the temples 22. Then, by pressing the clasps 231 respectively into the positioning holes 222 of the temples 22 and the apertures 211 of the lenses 212, the head portions 233 of the clasps 231 are made flush respectively with the surfaces of the first clamping arms 221. This also results in the legs 234 of the connectors 23 being firmly and respectively engaged to the rear surfaces of the lenses 212, and the clamping of the legs 234 respectively to the vertical members 236. In the preferred embodiment, the legs 234 of each of the connectors 23 are formed respectively with hooks 2341 that abut against the rear surface of the respective one of the lenses 212 such that the respective ones of the lenses 212 and the first clamping arm 221 of the respective temple 22 are clamped between the hooks 2341 and the head portion 233 of the clasp 231.

It is to be noted that the eyeglasses 2 are not limited to such rimless eyeglasses as described above. Eyeglasses having a frame (not shown) can also be utilized, in which case the apertures 211 may be formed directly in the frame as opposed to in the lenses 212. Through use of the connectors 23, the temples 22 can still be simply and securely engaged with the frame.

In some embodiments, the legs 234 of each of the clasps 231 can be integrally formed with the first clamping arm 221 of a respective one of the temples 22. In such a case, the head portions 233 may be omitted from the configurations of the clasps 231, and the positioning holes 222 no longer need to be formed in the temples 22. Moreover, the couplings 232 may be either integrally formed with the second clamping arms 223 of the temples 22 or disposed directly on the lenses 212 at the rear surfaces thereof. With such alternative structures, by inserting the legs 234 into the apertures 211 in the lenses 212, the legs 234 engage the rear surfaces of the end portions of the lenses 212, as well as the couplings 232. Hence, the temples 22 can still be easily and securely clamped onto the lenses 212.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. Eyeglasses comprising:
   a lens unit having opposite end portions and opposite front and rear surfaces, and formed with a pair of apertures respectively in said end portions;
   a pair of temples each having a front end connected to a respective one of said end portions of said lens unit; and
   a pair of connectors each including
      a coupling provided on said front end of a respective one of said temples and aligned with said aperture in a respective one of said end portions of said lens unit, and
      a clasp having a pair of legs inserted through said aperture in a respective one of said end portions of said lens unit, that abut against said rear surface of the respective one of said end portion of said lens unit, and that sandwich said coupling therebetween.

2. The eyeglasses of claim 1, wherein said lens unit includes a pair of rimless lenses, said lenses respectively having said end portions of said lens unit and said apertures formed respectively in said end portions.

3. The eyeglasses of claim 2, wherein each of said temples includes a first clamping arm that abuts against said front surface of said end portion of a respective one of said lenses, said first clamping arm being formed with a positioning hole that is aligned with said aperture in the respective one of said lenses, said clasp of each of said connectors including a head portion that abuts against said first clamping arm of the respective one of said temples, said legs of said clasp being connected to said head portion and extending through said positioning hole and said aperture.

4. The eyeglasses of claim 3, wherein said legs are formed respectively with hooks that abut against said rear surface of the respective one of said lenses such that the respective one of said lenses and said first clamping arm of the respective one of said temples are clamped between said hooks and said head portion of said clasp.

5. The eyeglasses of claim 3, wherein each of said temples further includes a second clamping arm that abuts against said rear surface of said end portion of the respective one of said lenses, said coupling of each of said connectors being formed as a single piece with said second clamping arm.

6. The eyeglasses of claim 5, wherein said coupling of each of said connectors is L-shaped and includes a horizontal member extending horizontally from said second clamping arm to above said legs of said clasp, and a vertical member extending vertically from an end of said horizontal member distal from said second clamping arm and between said legs.

* * * * *